3,366,371
CARBURETOR WITH THERMALLY INSULATED FUEL SYSTEM
Donald A. Reise, St. Louis, Mo., assignor to ACF Industries, Incorporated, New York, N.Y., a corporation of New Jersey
Filed Aug. 4, 1966, Ser. No. 570,218
7 Claims. (Cl. 261—66)

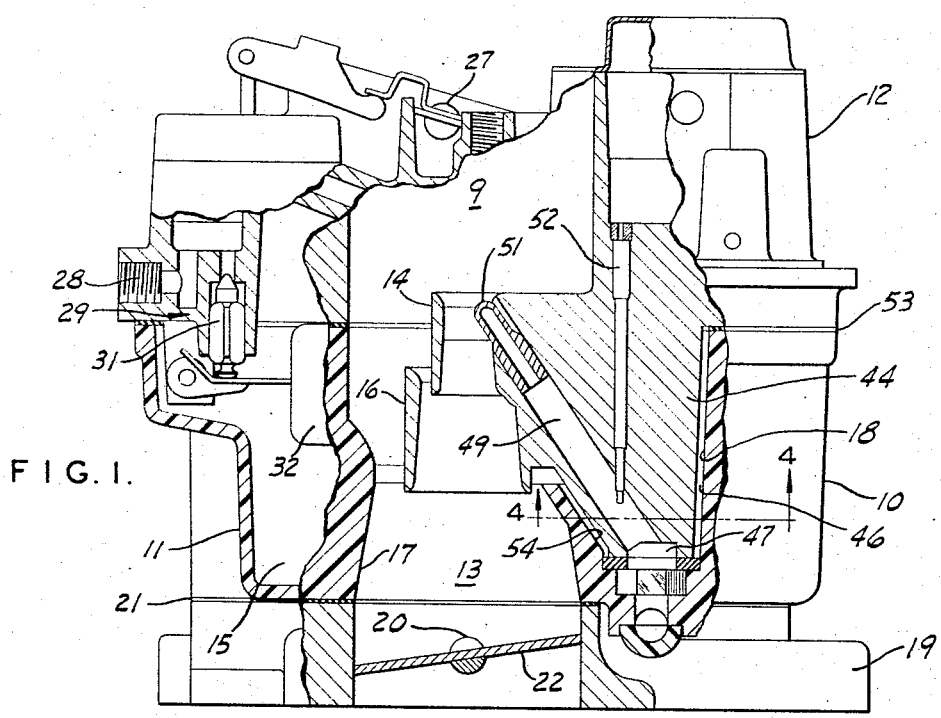
FIG. 1.
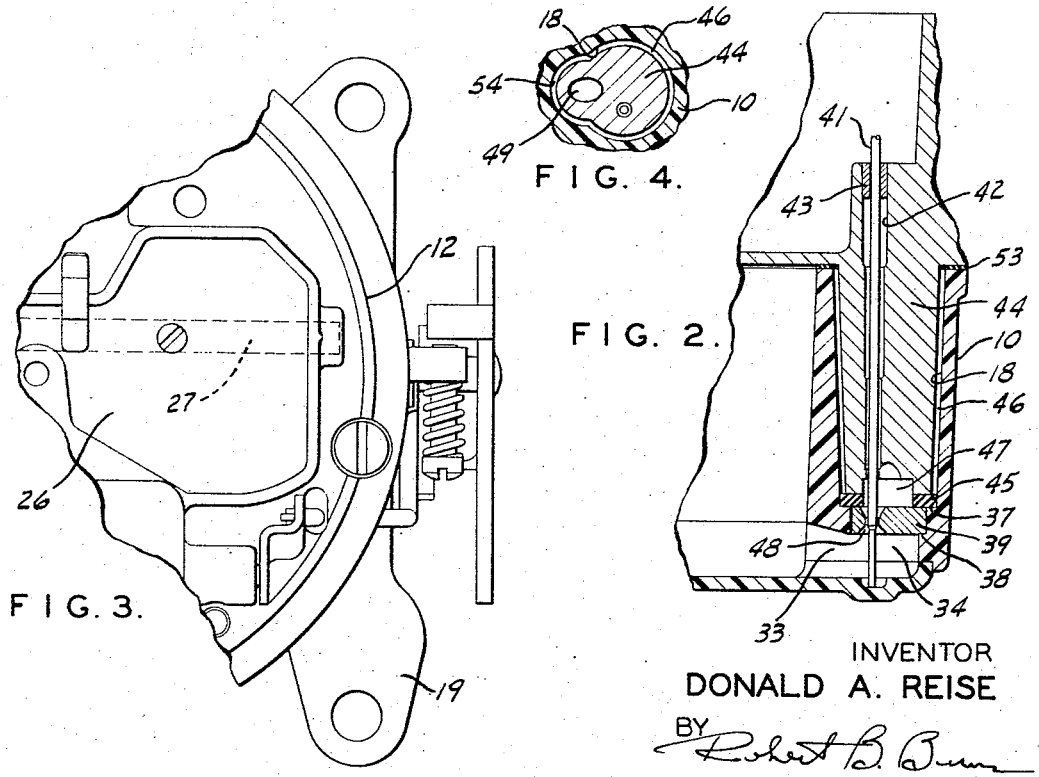
FIG. 4.
FIG. 2.
FIG. 3.
INVENTOR
DONALD A. REISE
BY *Robert B. Burns*
ATTORNEY United States Patent Office 3,366,371
Patented Jan. 30, 1968

ABSTRACT OF THE DISCLOSURE

A carburetor characterized by a body section which includes a fuel bowl and a fuel well. A cover attached to the body forms a seal or closure over the latter, a portion of which cover depends downwardly therefrom and is normally registered in the fuel well. The downwardly depending, fuel carrying portion of the cover is spaced from the adjacent walls of the well to form an air or vacuum barrier to avoid or at least minimize transfer of heat to the fuel.

---

This invention relates to a carburetor for an internal combustion engine.

It relates in particular to a charge forming device embodying a fuel system having the normal idle and varying speed facilities. The device includes a body having a mixture conduit, and low thermally conductive fuel bowl carried on the body for holding a supply of vaporizable fuel. A cover plate removeably attached to the body includes a fuel system comprised of jets and passages for directing a solid fuel stream into the mixture conduit. At least a portion of the fuel system is contained within a housing depending from the removeable cover plate. Said housing is registered in a fuel holding well, being so arranged within the latter to be contiguous with and spaced slightly from the walls thereof, out of contact with fuel in said fuel bowl and said passage, thereby avoiding fuel vaporization often due to excessive carburetor heating.

An ever present problem associated with contemporary internal combustion engines utilizing a volatile fuel, is the propensity of the latter toward vaporization. Most fuels for automotive use exhibit a high degree of volatility, and even at ambient temperatures and pressures will undergo vaporization. However under some circumstances the automobile "under the hood temperature," and even the ambient temperature, are sufficient to greatly accelerate the rate of fuel vaporization. The problem is compounded further in the instance of a carburetor, by locating the latter close to the engine. The normal mode for so mounting the carburetor is to position the same either at the top, or the side of the engine, thereby forming an inadvertent though efficient heat path from the engine to fuel held in the carburetor.

Various expedients have been utilized with the purpose of minimizing the degree of fuel vaporization. These follow the general proposal of either deflecting heat from the carburetor or thermally insulating parts of the latter. One such development is claimed in U.S. Patent 3,076,639, J. L. Szwargulski et al., which embodies a non-metallic fuel bowl and a removeable cover. In this arrangement however a detriment exists in that parts of the carburetor cover extend downwardly into the fuel supply, thereby facilitating a rapid transfer of heat to the latter and consequently effecting a high degree of vaporization.

The problem of fuel vaporization as above mentioned is contingent directly on engine temperatures and ambient conditions. Vaporization however is found to be most pronounced when the engine is burdened with a heavy load such as when moving up a grade at a reduced speed. Further when the engine has been stopped after a long hot run, subsequent hot soaking tends to rapidly deplete the carburetor fuel bowl by vaporizing fuel from the latter.

In the above noted U.S. Patent 3,076,639, the patentees' novel arrangement includes not only a plastic fuel bowl to minimize thermal conduction through the walls of the latter, but further suggests the provision of a well or the like into which a portion of the removeable cover is received, thereby defining an area of relatively low thermal conductivity between the cover and the carburetor body.

It is appreciated that while the portions of the carburetor may be formed of plastic, or other low thermally conductive material to minimize the heat transfer, this concept must be minimized in view of both physical strength and cost considerations. One expedient toward minimizing thermal passage of heat through the carburetor separate portions is by means of gasketing positioned between the respective portions. Thus, for example, while a layer of gasketing material may be positioned between the carburetor body and the removeable top, the latter still accumulates a considerable amount of heat which tends to pass off into the cooler carburetor body and in particular to fuel into which it may come in contact.

FIGURE 1 is a side elevation view of a carburetor embodying the present invention impartial cross section, having portions thereof broken away to show the interior structure.

FIGURE 2 is a segmentary view of a portion of the carburetor structure shown in FIGURE 1.

FIGURE 3 is a segmentary view on an enlarged scale showing a top view of the carburetor of FIGURE 1.

FIGURE 4 is a segmentary view on an enlarged scale and in cross section taken along line 4—4 in FIGURE 1.

The features of the invention to be hereinafter described may be incorporated into various forms and embodiments of carburetors including single barreled, multi-barreled, and the air valve type. Referring to FIGURE 1, the carburetor there illustrated includes a central body portion 10 which may be formed of either a metallic material or a thermo-setting, sufficiently strong phenolic resinous material. The body is adapted to receive a fuel bowl 11 holding a fuel reservoir 15 and having an open end which sealably engages the cover plate 12. The body further includes a mixture conduit 13 extending vertically therethrough which is comprised primarily of a series of venturis 14, 16 and 17 disposed in axial alignment.

The body is adapted to receive fuel bowl 11 which includes means forming a passage from the reservoir formed in the fuel bowl, to an upright well 18. The body may also include similar passages formed therein to receive an accelerating pump together with other features normally embodied in carburetor construction which however are unrelated directly to the present invention.

The lower end of the body 10 terminates in a face to which a flange 19 is attached through a sealing gasket 21. Positioned within flange 19 is a throttle comprising a plate 22 disposed within the mixture conduit for regulating air-fuel mixture passing therethrough, and carried on a throttle shaft 20. The latter as is normally practiced, extends through the flange and is adapted at one end to engage a suitable linkage for controlling the speed of engine by manipulation of the throttle plate.

Flange 19 includes a plurality of openings so disposed as to engage mating openings in the inlet manifold of an internal combustion engine. Flange 19 may also have suitable carburetor adjustment such as an idle adjust facility and the like.

The upper end of body 10 is provided as herein noted, with cover plate 12 which sealably engages the upper edge of the body 10 to form a fluid tight seal thereabout. Cover plate 12 is adapted to engage an air filter for passing an air stream into the mixture conduit 13. Following normal practice, an inlet 9 is provided with a choke valve 26 mounted on a rotatable choke shaft 27, the latter being adjustable either automatically or manually to vary the airflow entering mixture conduit 13.

Cover plate 12 is further provided with a fuel inlet 28 including a fuel regulating valve 29 having a moveable element 31 which is connected at one end to a float 32 pivotably disposed in the fuel bowl 11 and moveable in response to the level of fuel contained in reservoir 15.

Valve element 31 as shown is actuated by the connection to the float 32 in such manner to form a variable fuel passage.

Fuel inlet 28 is normally connected to a fuel pump which is in turn communicated with the fuel tank thereby directing a pumped flow into bowl 11 in response to the level of fuel in reservoir 15. When of course the bowl 11 is filled element 31 will be urged into closing engagement with its mating seat thereby closing the fuel passage.

Fuel bowl 11 is provided with an outlet passage 33 formed in the lower side of the body 10 and terminating at chamber 34.

The carburetor body 10 includes well 18 defined by upstanding walls which open into mixture conduit 13 by way of passage 54. As shown particularly in FIGURE 2, the lower end of well 18 is provided with a peripheral shoulder 37 and a second shoulder 38 spaced from said first shoulder. A removeable orifice plate 39 is supported against shoulder 38 and includes one or more openings extending therethrough. The orifice plate may be circular in configuration to be slideably received in a corresponding portion of the well 18 however, the said orifice plate preferably assumes an irregular configuration to mate with a corresponding aperture thereby correctly positioning the orifice plate as is required.

In the instant arrangement, orifice plate 39 is aligned with a metering rod 41 which passes upwardly through an elongated passage 42. The rod is slideably retained at the upper end by a packing member 43 and connected externally to a suitable linkage for actuating the metering rod to provide the most efficient passage opening to accommodate fuel flow from the chamber 34 through the orifice plate 39.

Orifice plate 39 is retained in well 18 by the downward urging of housing 44 which depends from the cover plate 12, and having enclosed passage means formed therein defining the major part of the carburetor fuel system. Housing 44 includes primarily peripheral walls which conform substantially in configuration to the wall structure of well 18. The lower end of housing 44 compressibly urges a sealing gasket 45 into liquid tight engagement with the upper face of orifice plate 39 thereby preventing the passage of fuel into the annular space, 46 defined by the adjacently disposed walls of housing 44 and the well 18.

Housing 44 as shown in FIGURE 2, includes a lower chamber 47 receiving fuel from the variable opening orifice 48. An elongated upwardly extending passage 49 conducts fuel from chamber 47 toward nozzle 51, having the open end thereof disposed within the venturi 14 such that a liquid fuel stream might be aspirated from nozzle 51 in response to airflow passing through the mixture conduit 13. An idle passage 52 also formed in housing 44 is communicated at its open end with fuel passage 49, carrying a minimal amount of fuel through passage 52 for introduction to mixture conduit 13 when the engine is operating under idle conditions.

As shown particularly in FIGURE 2, insulating space 46 formed about the housing 44 is terminated at the upper end in a resilient gasket or packing means 53. Thus, insulating space 46 is sealed at both upper and lower ends, and is communicated with mixture conduit 13 by means of a passage 54.

During normal operation of the internal combustion engine the liquid fuel flow will be regulated into the float chamber or reservoir 15 within bowl 11 in accordance with the fuel demand as dictated by the engine. The fuel will then pass through passage 33, orifice 48, chamber 47, passage 49 and through nozzle 51 for mixture with the airstream passing through the venturi 14. In effect, the liquid fuel will not come into direct contact with the external surface of housing 44 until being passed into chamber 47 and through passage 49.

Under all conditions of engine operation a degree of air will be drawn through mixture conduit 13 in accordance with the opening defined by the throttle plate 22. The degree of vacuum established in the mixture conduit 13 will of course depend on the engine condition which reflects engine speed and load. For example at idle or at low speeds the degree of vacuum established in the mixture conduit 13 will be substantially less than when the engine runs at higher speeds. Because of the direct communication by passage 54 with the mixture conduit 13, and the annulus space 46, the latter will always be at substantially the same degree of vacuum as is prevalent in mixture conduit 13. Thus, it is clear that for all engines speeds, the annular space 46 about housing 44, will be evacuated thereby defining a nonthermally conductive insulating space.

In accordance with the basic concepts of the present arrangement this provision of the insulating space about housing 44 will preclude the passage of any substantial amount of heat from the warm cover plate 12 and housing 44, down into the body of the carburetor due to direct contact between the housing and the well 18. Further, sealing gasket 45 compressed between the lower surface of housing 44 and the orifice plate 39 will establish a further although not quite as efficient thermal barrier between the housing and the body.

It is appreciated that when the engine operation is discontinued the pressure within the mixture conduit 13 will rise substantially to atmospheric pressure. Thus the annular space 46 between housing 44 and well 18 will be occupied instantaneously with in-rushing air at atmospheric pressure.

As previously mentioned a considerable amount of fuel vaporization is experienced when the engine operation is discontinued such that it undergoes a hot soak period, as after a long hot run or when the engine is permitted to rest in a relatively high ambient temperature. During such a period it has been found that a considerable amount of heat is transferred to the fuel by way of the housing 44 being directly immersed in fuel or directly in contact with the adjacent well 18. With the present arrangement however maintaining of space 46 about housing 44, substantially minimizes or obviates heat transfer between the walls of the normally heated housing 44 and the surface of the body within well 36 even though space 46 is occupied with air.

It is clear then that the present concept of minimization of fuel vaporization is readily achieved by means of the herein defined insulating space formed between the adjacently positioned walls of housing 44 and well 18. It is understood that the highest degree of efficiency is of course achieved when the engine is operating and the space 46 is evacuated to an equivalent of vacuum in the mixture conduit. In other words the higher the degree of vacuum in the space 46, the lesser will be the passage of or conduction of heat into body 10 from the housing 44.

While the present structural arrangement includes the respective conduits and venturis 14 and 16 as depending directly from a wall of housing 46, such construction is not essential to the carrying out of the objectives of the invention which reside in the minimization of heat transfer from the cover plate 12 to fuel held with the body of the carburetor. It is noted however that the temperature within mixture conduit 13, because of the vaporization of fuel therein caught up within the airstream passing through the respective venturis, will be maintained relatively cool. Thus with the engine operation discontinued and undergoing a hot soak, heat from the cover plate 12 will tend to be dissipated into the mixture conduit rather than conducted into the carburetor body.

It is readily seen that the present arrangement constitutes a simple yet efficient means of avoiding excessive fuel vaporization by the expedient of completely insulating the carburetor cover plate from the carburetor body which holds the fuel reservoir. It should be appreciated however that the presently described arrangement is exemplary of the instant invention, and that various modifications and changes may be made with respect to the latter without departing from the spirit and scope of the invention as hereinafter described.

I claim:

1. In a carburetor adapted for solid fuel system operation including;
   (A) a body having,
      (1) a fuel bowl holding a reservoir of liquid fuel and communicated with a supply thereof,
      (2) a venturi section opened to a source of air and forming an air mixture conduit,
      (3) a well formed in said body adjacent to said fuel bowl and including a fuel passage communicated with the latter,
   (B) a cover means removably attached to said body forming a closure to said fuel bowl,
   (C) means forming a restriction in said flow passage for regulating the rate of fuel flow therethrough,
   (D) a housing downwardly supported and being in registry with said well,
   (E) said housing having at least one passage therein defining a portion of said carburetor fuel system and opening into said well formed in said body to receive fuel from the latter,
   (F) said housing having side walls spaced from adjacent walls of said well to define an insulating void therebetween, and
   (G) a gasket compressively deformed in said well by said housing and forming an annular fuel-tight seal to avoid entry of fuel into said void formed intermediate said housing and said well,
   (H) thereby precluding substantial contact between said housing walls and fuel held in said well to preclude transfer of heat to the fuel and thus avoid fuel vaporization.

2. In a carburetor as defined in claim 1 including,
   (A) means forming a recess in the lower part of said well,
   (B) an orifice plate disposed in said recess and having at least one orifice traversing the same defining said means forming said restriction,
   (C) and seal means compressively retained against said orifice plate to define an annular fuel-tight seal to preclude entry of fuel from said well into said void intermediate said housing and said well.

3. In a carburetor as defined in claim 1 including a metering rod slidably received in said housing and registered in said means forming a restriction to regulate fuel flow through the latter.

4. In a carburetor as defined in claim 1 wherein means communicates said void intermediate said housing wall and said well with a source of sub-atmospheric pressure to at least partially evacuate said void.

5. In a carburetor as defined in claim 1 wherein means communicating said void with said mixture conduit for equalizing the pressure therebetween.

6. In a carburetor as defined in claim 1 wherein said housing is dependent from said cover means and is integral therewith, and said means communicating said mixture conduit with said void formed intermediate said housing wall and said well.

7. In a carburetor as defined in claim 6 wherein said venturi section is dependent from the wall of said housing.

References Cited

UNITED STATES PATENTS

| | | | |
|---|---|---|---|
| 2,208,702 | 7/1940 | Read | 261—69 X |
| 2,699,326 | 1/1955 | Anderson et al. | 261—69 X |
| 3,076,639 | 2/1963 | Szwargulski et al. | 261—69 X |
| 3,100,236 | 8/1963 | Ott et al. | 261—72 X |

RONALD R. WEAVER, *Primary Examiner.*